United States Patent
Maria

(10) Patent No.: US 11,689,996 B2
(45) Date of Patent: Jun. 27, 2023

(54) ACCESS IDENTIFIER AND NETWORK SLICE ACCESS MANAGEMENT

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 49 days.

(21) Appl. No.: 17/223,977

(22) Filed: Apr. 6, 2021

(65) Prior Publication Data

US 2022/0322211 A1  Oct. 6, 2022

(51) Int. Cl.
*H04W 48/16* (2009.01)
*H04W 28/06* (2009.01)

(52) U.S. Cl.
CPC .......... *H04W 48/16* (2013.01); *H04W 28/06* (2013.01)

(58) Field of Classification Search
CPC ...... H04W 76/12; H04W 48/16; H04W 28/06
See application file for complete search history.

(56) References Cited

U.S. PATENT DOCUMENTS

2021/0043320 A1* 2/2021 Malkenson ............... G06F 8/38

* cited by examiner

*Primary Examiner* — Diane D Mizrahi
(74) *Attorney, Agent, or Firm* — Amin, Turocy & Watson, LLP

(57) ABSTRACT

An access identifier and network slice access management component (ANMC) is disclosed. The ANMC can receive service access update information from an entity, for example a customer/enterprise, that be used to update service access of a user equipment (UE) to services of a network. Embodiments of the ANMC can facilitate updating an access identity parameter, updating an access priority parameter, updating a network slice access parameter, or combinations thereof. An ANMC can be embodied in a virtualized network function, as hardware, as software, or combinations thereof. An ANMC can be local to a network supporting the UE or can be located remotely from the network supporting the UE, such as in execution on a server of a cloud platform. The ANMC can support management of UE service access by an entity other than a carrier supporting the UE via a device external to a network of the carrier.

20 Claims, 10 Drawing Sheets

ACCESS IDENTIFIER AND NETWORK SLICE ACCESS MANAGEMENT

TECHNICAL FIELD

The disclosed subject matter relates to management of access by a user equipment (UE) to a service via a network, e.g., a 5G network, etc., and more specifically to management of a UE access identifier, UE network-slice access, or combinations thereof.

BACKGROUND

For many modern networks, an access identity value can be specified, for example, in release 15 of the third generation partnership project (3GPP) standard, fifth generation (5G) Access Identities (AI) are specified as a replacement for fourth generation (4G) Access Class structures. The 5G AI standards can be used to determine priorities when attaching a user equipment (UE) to a 5G radio access network (RAN) of a 5G network. It is noted that conventionally, 5G Access Identities are assigned during SIM provisioning process by the carrier and are thus static. Moreover, conventional mechanisms can statically assign a priority value to a UE, for example, 4G LTE specifications define mechanisms and values for Access Class Barring technology and can enable a carrier in assigning a UE a priority for attaching to the network.

DETAILED DESCRIPTION

Figure 1:
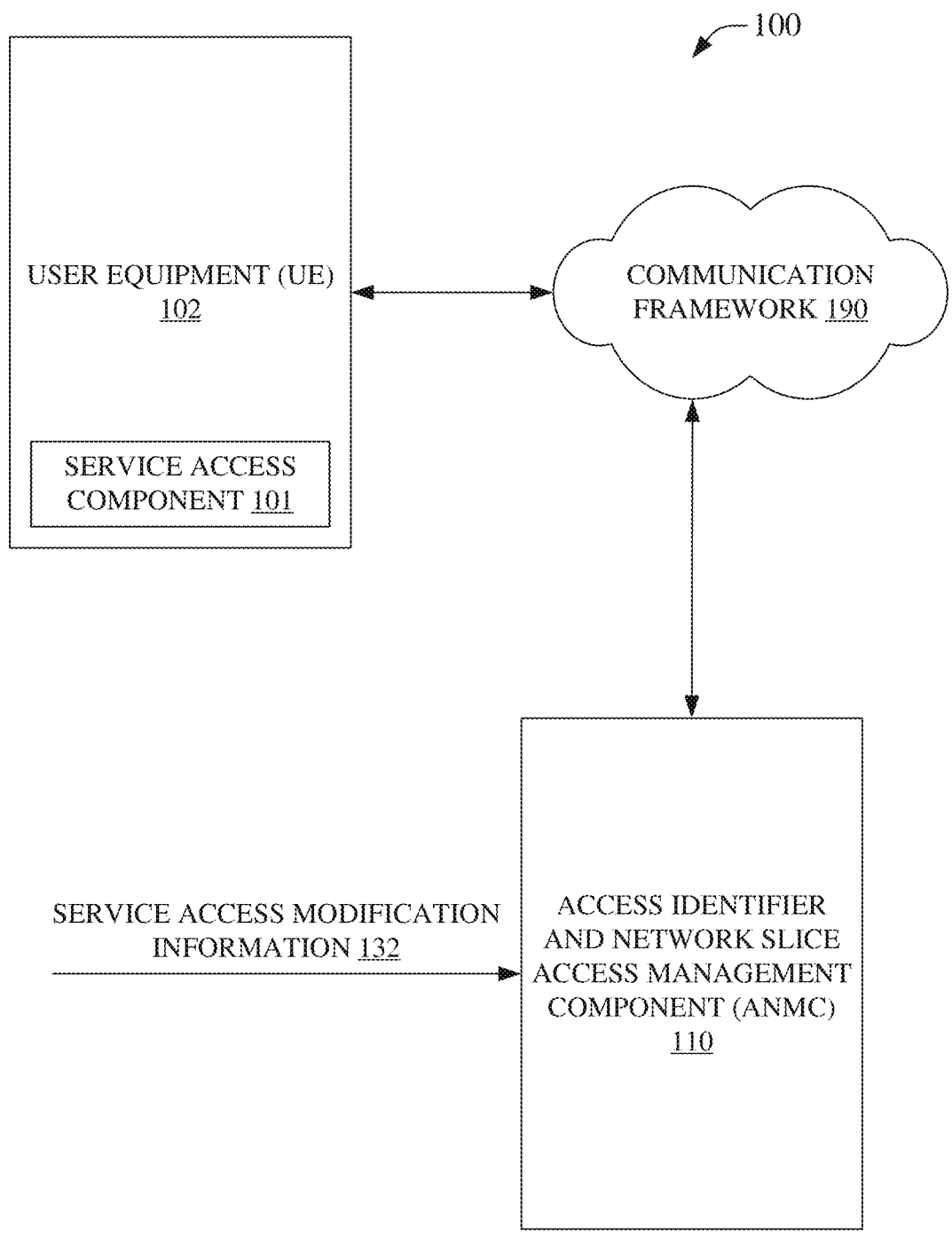
FIG. 1 is an illustration of an example system that can enable implementing an access identifier and network slice access management function to manage service access between a user equipment and a network service, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As is noted for conventional systems, static access values have been designated in some modern standards. However, carrier modification of access values assigned to UEs remains poorly defined. Moreover, technology to enable extra-carrier modification of UE access values has not been observed. It can be desirable to alter, update, modify, change, reassign, etc., an access value, and similarly, a network slice access parameter, for UEs based on indications from a customer, enterprise, or other entity not typically recognized as a carrier. The instant subject disclosure is related to a management of service access, e.g., access values, network slice access, etc. In accord with other modern network technology, an access identifier and network slice access management function can be deployed as a virtual function, virtual machine, etc. In some embodiments, the access identifier and network slice access management function can be embodied in hardware, software, or combinations thereof. Hereinafter, an access identifier and network slice access management function in execution can be termed an access identifier and network slice access management component (ANMC). An ANMC can assign an AI value, update, change, modify, alter, etc., an assigned AI value, delete an AI value, assign a new AI value, etc. Moreover, an ANMC can support similar operations in regard to network slice access for a UE. Additionally, an ANMC can enable migration of AI and network slice access parameters to other networks, e.g., from a first carrier to a second carrier, etc., which can support movement of a UE between networks while maintaining priorities and slice access. A layer of ANMC translation can enable the ANMC functionality to be carrier agnostic such that, for example, even where different carriers do not similarly define a network slice, the ANMC can translate a network slice of a first carrier into a corresponding slice of a second carrier.

In regard to an ANMC providing for an AI no longer being permanently assigned by the carrier to a UE, the ANMC can enable use of an external interface, for customers, enterprises, or other entities, to designate an AI value, e.g., facilitating a customer updating, changing, etc., an AI and/or network slice access to enable or limit access to different services than before the update, change, etc. A carrier can then use the updated service access value to determine what services, and at what priority levels, can be connected to via the network. In an embodiment, the disclosed subject matter can enable a carrier to offer services to enterprises and consumers that can be tailored to specific use cases, for example, higher priorities for connected vehicles, limiting access by non-employ UEs to corporate data sources, providing the most elite services to visiting dignitaries' devices, etc. In addition, the ability to provision and communicate network slices indicators across carriers can enhance a subscriber experience, for example, to expand cross-carrier communication, facilitate the use of network slicing among global carriers and private networks, further support cybersecurity initiatives by only allowing network slicing in certain predetermined situations, etc. The disclosed management of a UE access identifier, UE network-slice access, or combinations thereof, by an entity corresponding to the UE via an access identifier and network slice access management (ANMC) function local to, or remote from, core network equipment can serve to vastly improve the functionality of networks over conventional techniques.

It is noted that in a 5G core network (5GC), network functions can include elements supporting access mobility (AMF), session management (SMF), security, e.g., authentication server function (AUSF), unified data management function (UDM), application function (AF), etc., policy control function (PCF), among many other functions. Generally, a modern network function can reside in a virtual machine, e.g., can operate within the virtual machine environment. In turn, a modern virtual machine can reside in a software container, typically an orchestrated software container such as KUBERNETES, etc., that can typically be customized by an operating entity. It is common for 5GCs to reside in facilities that serve regions, for example, national technical centers, local regional centers, etc., that can typically be larger than might be served by an enterprise, residence, etc. In some embodiments of the presently disclosed subject matter, an ANMC can be deployed as a further network function, either as hardware, software, or a combination thereof, for example as virtual network function (VNF) within core network equipment, e.g., as part of a 5GC, etc. Moreover, in some embodiments, an ANMC can be deployed as a separate component from the 5GC equipment, e.g., as a VNF executing on a sever located remotely from the 5GC or other carrier core network equipment.

An ANMC can perform as a virtualized function(s). It is noted that modern networks have generally evolved to move away from dedicated specialized hardware that could typically become quickly outdated and thereby increase expense and decrease a rate at which a carrier could cost-effectively improve their network, e.g., even where newer technology existed it might not be implemented due to insurmountable upgrade costs and interoperability with other network components. As such, the use of virtualized functions is now quite widespread in the industry and these VFs can typically be implemented on commercial off the shelf hardware (COTS). To be sure, COTS are transformed into specialized and non-generic computer equipment by performing the virtualized functions. As an example, a server blade executing a virtual session management function is not generic in nature even if the blade itself may be generic, e.g., the execution of the virtual function transforms the blade into very non-generic computer equipment.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate implementing an access identifier and network slice access management function to manage service access between a user equipment and a network service, in accordance with aspects of the subject disclosure. System 100 can comprise access identifier and network slice access management component (ANMC) 110 that can receive service access modification information 132. An ANMC can provide for access identifier management, network slice access management, or combinations thereof.

As a first example, in response to receiving service access modification information (SAMI) 132, ANMC 110 can determine an access identifier and can communicate with other components of system 100 to implement the determined access identifier, e.g., communicating corresponding information to service access component 101 of UE 103 via communication framework 190, etc. Accordingly, in this first example, UE 102 can be provisioned according to the example determined access identifier. While not identity module (SIM) card, electronic SIM (eSIM) function, or other function of UE 102. As a second example, in response to receiving service access modification information (SAMI) 132, ANMC 110 can determine network slice access for UE 102 and can communicate corresponding information to service access component 101 of UE 102. As in the above first example, ANMC 110 can further communicate corresponding information to appropriate network components to facilitate UE 102 accessing a network slice in accord with the determined network slice access.

An embodiment of the disclosed subject matter can comprise ANMC 110 receiving SAMI 132 and transmitting information corresponding to modification of service access for a UE and, as such, system 100 is illustrated in the context of UE 102 comprising service access component 101, and communication framework 190 for improved clarity. Service access modification can comprise enabling provisioning new service access via an access identifier, network slice access, or combination thereof, enabling modification of an existing access identifier, an existing network slice access, or combination thereof, enabling deletion/cancelling of an existing access identifier, existing network slice access, or combination thereof, and other similar modifications, alterations, changes, evolutions, updates, etc.

In some embodiments, service access modification can be performed by one or more system component, e.g., ANMC 110 can perform some management of service access and another component other than ANMC 110 can perform other management of service access. In an embodiment, the other component can be an ANMC other than ANMC 110 or can be a component that is not an ANMC. In an example, ANMC 110 can be added to an existing carrier core network equipment and be designated for management of access identifiers but not network slice access that, in this example, can be preferably managed by a network slice component already comprised in the example core network equipment. In another example, ANMC 110 can be employed to manage network slice access generally and employed to manage only a designated portion of access identifiers with the balance of access identifiers being managed (or not managed where they are statically assigned to UEs) by another system component. Notwithstanding these examples, ANMC 110 can be envisioned to more typically be employed to manage either access identifiers, network slice access, or both.

In embodiments, ANMC 110 can be comprised in network equipment, e.g., as a network function of a carrier core network equipment, as a discrete component comprised in a core network, etc. In some embodiments, ANMC 110 can be embodied in equipment remotely located from a network, e.g., as a virtualized network function on a cloud computing platform that can be communicatively coupled to carrier core network equipment, at a carrier managed device located at an enterprise facility to facilitate management of the UEs affiliated with the enterprise facility, etc., wherein affiliation between the UE and the enterprise can indicate that the enterprise can be associated with some level of control of the UE, such as the UE being issued to an employee of the enterprise, etc. Embodiments of the disclosed subject matter can comprise one or more ANMCs, e.g., ANMC 110 can be affiliated with a first carrier network and a second ANMC can be affiliated with a second carrier network. In these embodiments, ANMCs can operate as stand-alone service access managers for each corresponding carrier, can be interoperable to allow groups of ANMCs to manage service access at one or more network, can be cooperative to facilitate separate but coordinated service access management, etc. In an example cooperative embodiment, a first ANMC can support a first network that can encapsulate a second much smaller network that can be supported by a second ANMC. In this example, the first ANMC can share information with the second ANMC to enable coordinated service access. The example coordinated service access, for example, can enable a self-driving smart vehicle having high priority in the first network to be granted similarly high priority in the second network based on the coordinated serve access.

It can be appreciated that without coordinated serviced access it could be possible that when the example self-driving smart vehicle moved to the second network, with could be give lower priority that could result in the vehicle having difficulty properly operating in a self-driving mode, which could be associated with exiting a self-driving mode, reverting to the first network to again get high priority, or even a vehicle accident. As such, coordination of access identifiers, network slice access, or combinations thereof, can be strongly desired, more especially where service access is capable of being updated, modified, etc. Such coordination of service access can also be better enabled via a translation feature of the subject disclosure allowing for network agnosticism, e.g., different networks can employ different service access topologies and an ANMC can support translating between different serve access topologies. As an example, a first network can indicate a first network slice according to parameters 'XYZ,' while a second network can provide for a second network slice 'XY' and a third network slice 'W'. Where, in this example, 'W' is similar to 'Z', an example ANMC can translate the first network slice as being equivalent to a combination of the second and third network slices, such that, when a UE moves from the first network to the second network, coordinated service access can enable the UE to access the second and third slices, or conversely, when the UE moves from the second network to the first network, the UE can leave the second and third scales and access the first slice. Moreover, in a modification of this example where 'W' is not equivalent to 'Z', then ANMC can facilitate the second network in deploying a 'Z-like' slice to facilitate coordinated service access. Where the example second network will not provision a 'Z-like' slice, the example ANMC can indicate that service access is not fully supported between the first and second networks, which information can be employed in determining alternate resolutions should the UE indeed move between the two example networks.

Figure 2:
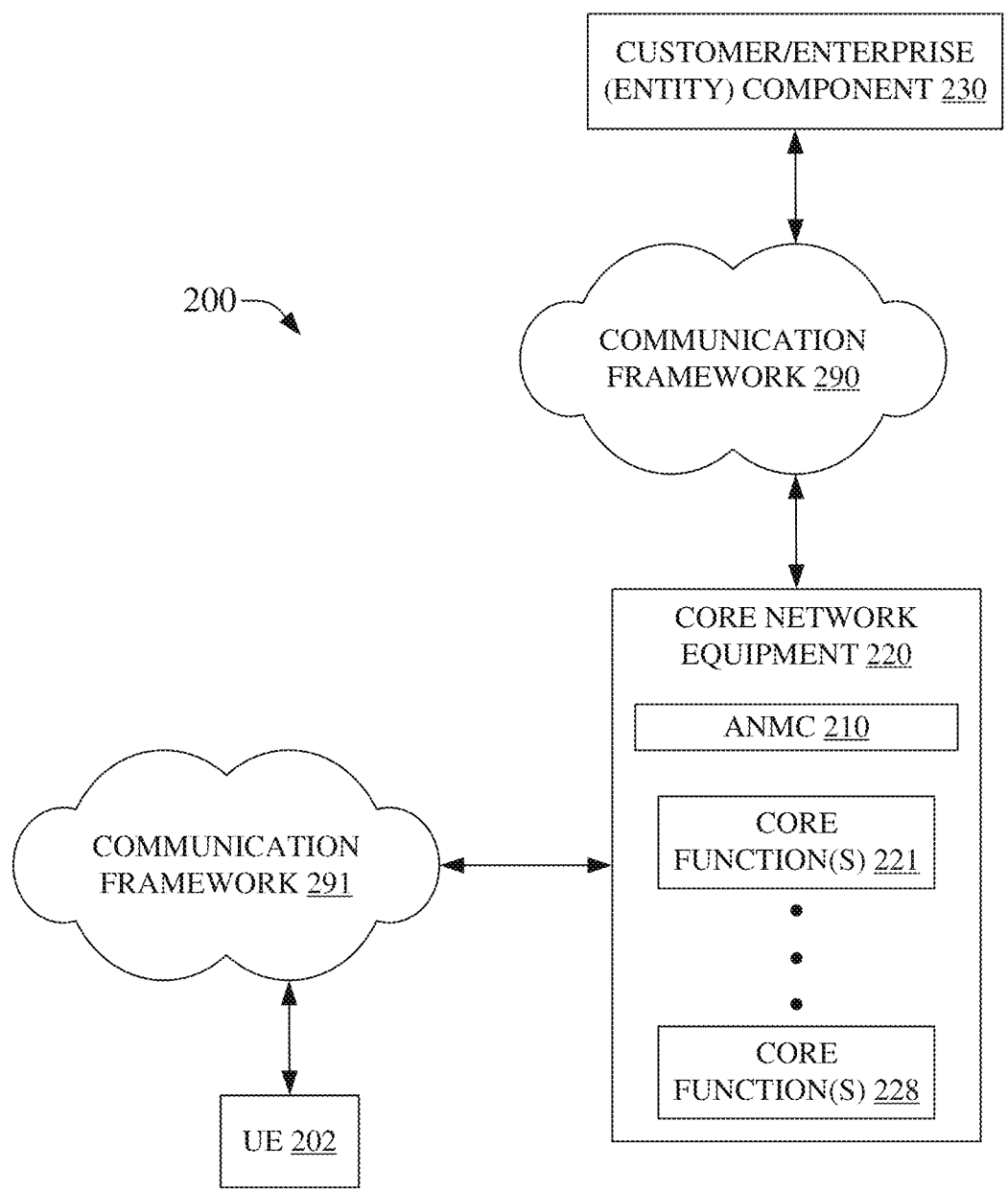
FIG. 2 is an illustration of an example system that can facilitate configuring a user equipment access identifier, user equipment network-slice access, or combinations thereof, via an access identifier and network slice access management function executing local to core network equipment, in accordance with aspects of the subject disclosure.

FIG. 2 is an illustration of a system 200, which can enable configuring a user equipment access identifier, user equipment network-slice access, or combinations thereof, via an access identifier and network slice access management function executing local to core network equipment, in accordance with aspects of the subject disclosure. System 200 can comprise core network equipment 220. Core network equipment can support operation of a network, e.g., a carrier network, and mobile virtual network operation (MVNO) network, a private enterprise network, even a residential home network, etc. Generally, core network equipment 220 can be communicatively coupled to UE 202 via communication framework 291, e.g., via a radio access network (RAN), access point (AP), etc. Core network equipment 220 can comprise core function(s) 221, . . . , 228, etc., wherein a core function can be, for example, an AMF, SMF, AUSF, AF, PCF, UD, etc., In an embodiment, a core function can be an ANMC. System 200 can illustrate core network equipment 220 comprising ANMC 210. ANMC 210 can be illustrated as distinct from core function(s) 221 to 228 to help illustrate that while ANMC 210 can be a core function itself, ANMC 210 can also be a discrete component of core network equipment 220, e.g., a separate device comprised in core network equipment 220, etc., without departing form the scope of the presently disclosed subject matter.

System 200 can further comprise communication framework 290 that can enable communication between customer/enterprise (entity) component 230 and core network equipment 220. Entity component 230 can receive customer input, for example, an indication to modify service access for UE 202, etc. Entity component 230 can therefore communicate an indication to change, modify, update, alter, replace, etc., service access parameters, e.g., for an access identity, a network slice access, or a combination thereof, to core network equipment 220 comprising ANMC 210. Accordingly, ANMC 210 can determine a corresponding service access parameter. ANMC 210 can facilitate propagation of a determined service access parameter, e.g., among core function (s) 221-228, etc., as well as to UE 202. In an embodiment, for example where communication framework 291 can be a RAN, AP, or other network edge equipment, updating UE 202 based on the determined service parameter can comprise an over-the-air update of UE 202. The update can be stored in a component of UE 202, for example, via a service access component, e.g., service access component 101, etc., see over-the-air service access update 434, for example.

In the illustrated example system 200, ANMC 210 can be comprised in core network equipment 220. In embodiments comprising more than one network, corresponding core network equipment can themselves comprise an ANMC instance, e.g., systems having multiple networks can comprise multiple ANMCs. In these embodiments, an ANMC can also operate remotely form a core network equipment, e.g., systems having multiple networks can comprise ANMC instances, some of which can operate in a corresponding core network equipment and others that can operate external to a corresponding core network equipment. Moreover, in these examples, not every network will have an ANMC, and some networks can have more than one ANMC, e.g., a network to ANMC ratio can be greater than 1:1, less than 1:1, or 1:1.

Figure 3:
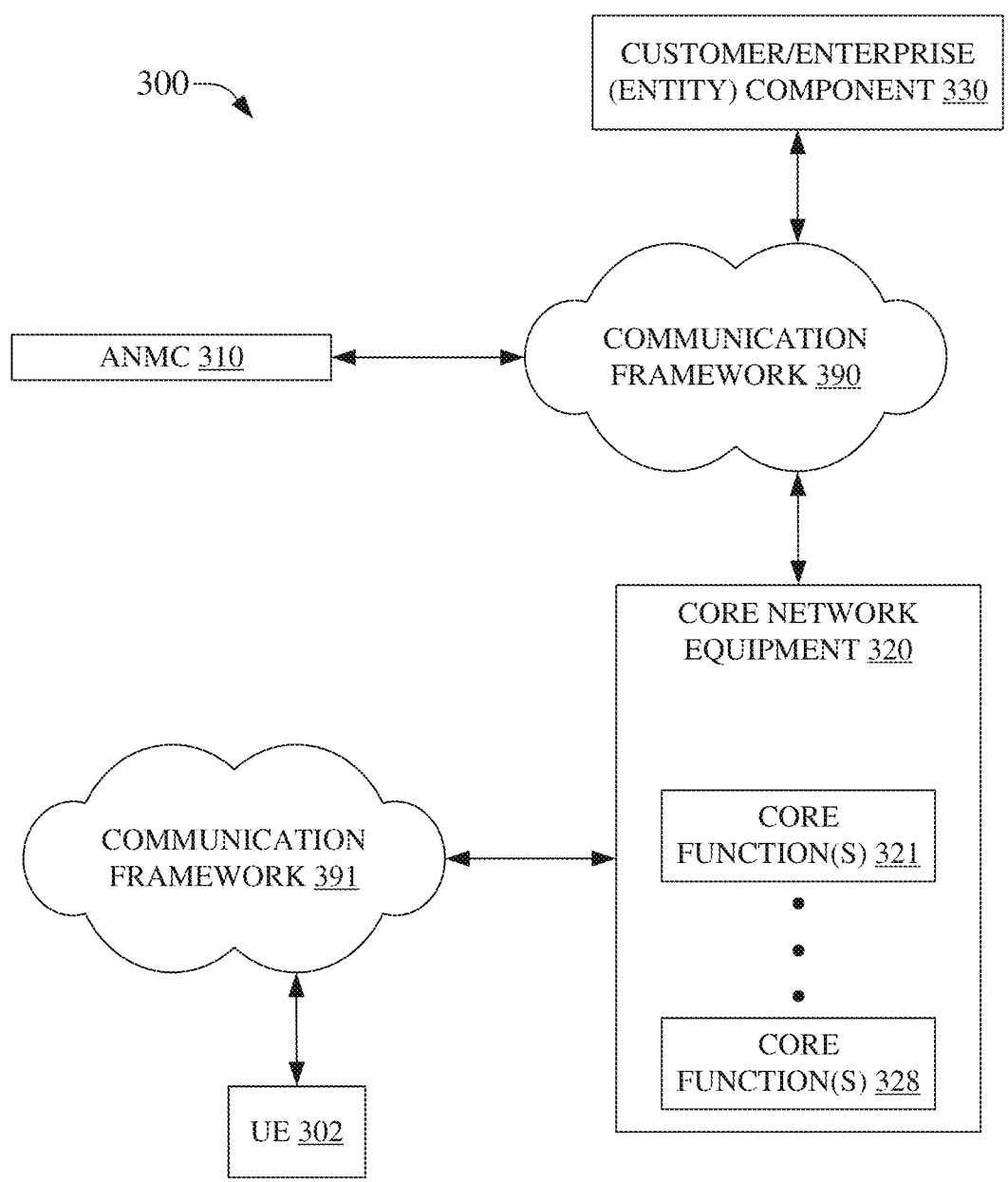
FIG. 3 is an illustration of an example system that can enable configuring a UE access identifier, UE network-slice access, or combinations thereof, via an access identifier and network slice access management function executing remotely from core network equipment, in accordance with aspects of the subject disclosure.

FIG. 3 is an illustration of a system 300 that can facilitate configuring a UE access identifier, UE network-slice access, or combinations thereof, via an access identifier and network slice access management function executing remotely from core network equipment, in accordance with aspects of the subject disclosure. System 300, similar to system 200, can comprise core network equipment 320. Core network equipment can again support operation of a network. Generally, core network equipment 320 can be communicatively coupled to UE 302 via communication framework 391. Core network equipment 320 can comprise core function(s) 321, . . . , 328, etc., which comprise an ANMC function, e.g., as in system 200. However, system 300 can illustrate ANMC 310 operating remotely from core network equipment 320. As is disclosed elsewhere herein, ANMC 310 can be distinct from core function(s) 321 to 328, and ANMC 310 can be a discrete component of system 300, e.g., separated from core network equipment 320 by communication framework 390, etc., without departing form the scope of the presently disclosed subject matter.

Communication framework 390 that can further enable communication between customer/enterprise (entity) component 330 and ANMC 310, and between customer/enterprise (entity) component 330 and core network equipment 320. Entity component 330 can receive customer input, for example, an indication to modify service access for UE 302, etc. Entity component 330 can therefore communicate an indication to change, modify, update, alter, replace, etc., service access parameters, e.g., for an access identity, a network slice access, or a combination thereof, to core network equipment 320 and ANMC 310. Alternatively, entity component 330 can communicate the indication to ANMC 310 that can then communicate a corresponding indication to core network equipment 320, or entity component 330 can communicate the indication to core network equipment 320 that can then communicate a corresponding indication to ANMC 310, resulting in appropriate subsequent communications between ANMC 310 and core network equipment 320. Accordingly, in response to the indication from entity component 330, either directly or via core network equipment 320, ANMC 310 can determine a corresponding service access parameter. ANMC 310 can facilitate propagation of a determined service access parameter, e.g., among core function (s) 321-328, etc., as well as to UE 302 via the illustrated communicative pathways. In an embodiment, for example where communication framework 391 can be a RAN, AP, or other network edge equipment, updating UE 302 based on the determined service parameter can comprise an over-the-air update of UE 302 via core network equipment 320. The update can be stored in a component of UE 302, again for example, via a service access component, e.g., service access component 101, etc., see over-the-air service access update 434, for example.

In the illustrate example system 300, ANMC 310 can be comprised external to, and located remotely from, core network equipment 320. In embodiments comprising more than one network, corresponding core network equipment can themselves comprise an ANMC instance, be associated with a remote ANMC instance, or some combination thereof. Also, again, not every network will have an ANMC, and some networks can have more than one ANMC, e.g., a network to ANMC ratio can be greater than 1:1, less than 1:1, or 1:1.

Figure 4:
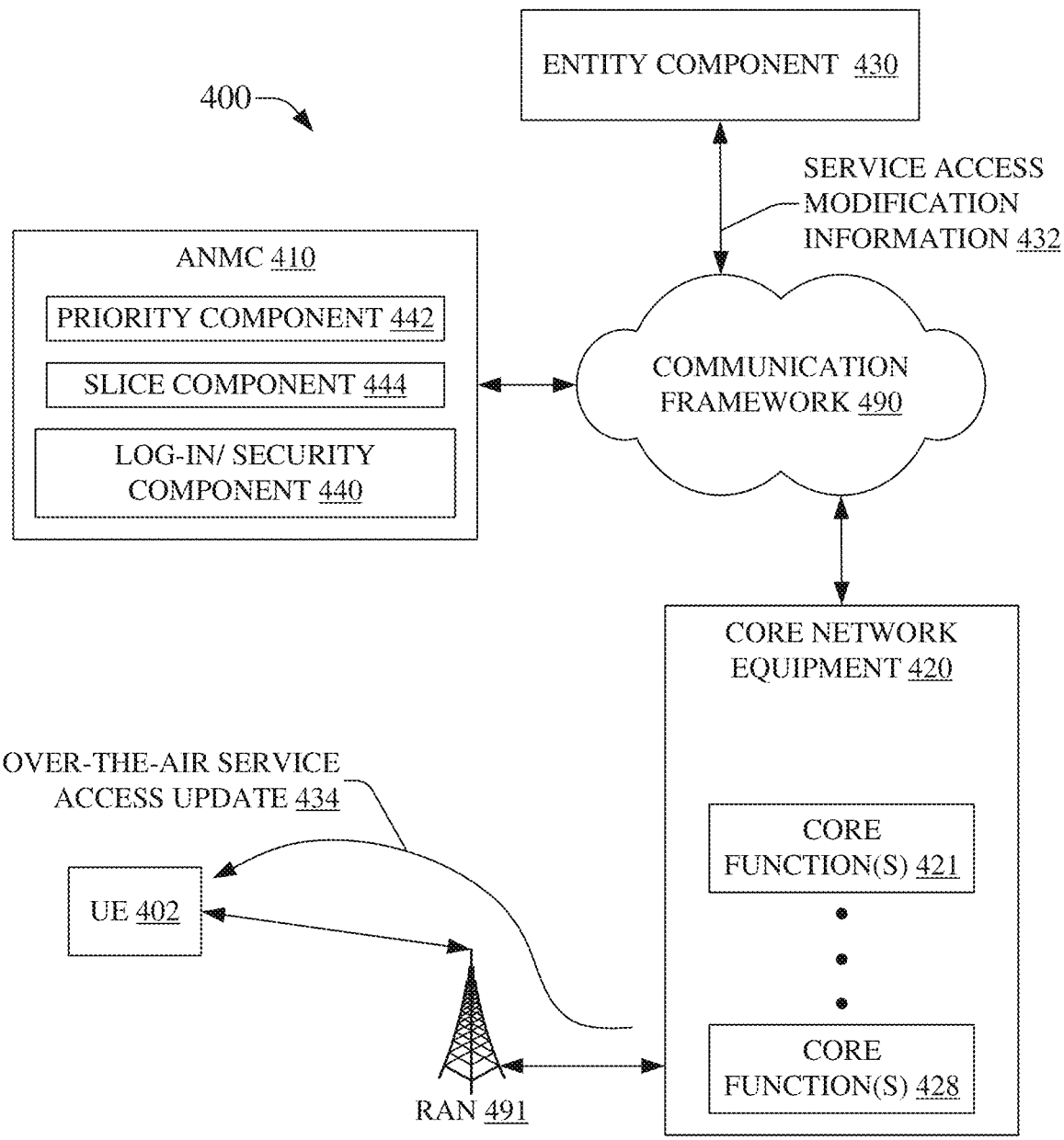
FIG. 4 illustrates an example system that can facilitate performing an over-the-air service access update to a user equipment via an access identifier and network slice access management function, which service access update can be in response to receiving service access modification information from an entity affiliated with management of the user equipment, in accordance with aspects of the subject disclosure.

FIG. 4 is an illustration of a system 400, which can enable performing an over-the-air service access update to a user equipment via an access identifier and network slice access management function, which service access update can be in response to receiving service access modification information from an entity affiliated with management of the user equipment, in accordance with aspects of the subject disclosure. System 400 can comprise core network equipment 420 that can itself comprise core function(s) 421, . . . , 428, etc. In some embodiments, core functions can comprise an ANMC function, e.g., as in system 200. However, system 400 can illustrate ANMC 410 operating remotely from core network equipment 420. As is disclosed elsewhere herein, ANMC 410 can be distinct from core function(s) 421 to 428, and ANMC 410 can be a discrete component of system 400, e.g., separated from core network equipment 420 by communication framework 490, etc., without departing form the scope of the presently disclosed subject matter. As in other presently disclosed systems, core network equipment 420 can support operation of a network and, generally, core network equipment 420 can be communicatively coupled to UE 402 via communication framework, here in system 400 illustrated as RAN 491.

Communication framework 490 that can further enable communication between entity component 430 and ANMC 410, and between entity component 430 and core network equipment 420. Entity component 430 can receive customer input, for example, an indication to modify service access for UE 402, etc. Entity component 430 can therefore communicate an indication to change, modify, update, alter, replace, etc., service access parameters, e.g., for an access identity, a network slice access, or a combination thereof, to core network equipment 420 and ANMC 410, for example, as service access modification information 432, 132, etc. Alternatively, entity component 430 can communicate SAMI 432 to ANMC 410 that can then communicate a corresponding indication to core network equipment 420, or entity component 430 can communicate SAMI 432 to core network equipment 420 that can then communicate a corresponding indication to ANMC 410, resulting in appropriate subsequent communications between ANMC 410 and core network equipment 420. Accordingly, in response to SAMI 432 from entity component 430, either directly or via core network equipment 420, ANMC 410 can determine a corresponding service access parameter. ANMC 410 can facilitate propagation of a determined service access parameter, e.g., among core function (s) 421-428, etc., as well as to UE 402 via the illustrated communicative pathways, e.g., as over-the-air service access update 434 of UE 402 via RAN 491, etc. Over-the-air service access update 434 can be stored in a component of UE 402, such as via service access component 101, for example.

In the illustrate example system 400, ANMC 410 can be comprised external to, and located remotely from, core network equipment 420. In embodiments comprising more than one network, corresponding core network equipment can themselves comprise an ANMC instance, be associated with a remote ANMC instance, or some combination thereof. Also, again, not every network will have an ANMC, and some networks can have more than one ANMC, e.g., a network to ANMC ratio can be greater than 1:1, less than 1:1, or 1:1.

ANMC 410 can comprise log-in/security component 440 that can restrict interactions with ANMC 410 to authorized communications, e.g., an authorized entity can send authorized communications into ANMC 410 to effect initiation of a service access update operation. In an embodiment, log-in/security component 440 can comprise a security database of provisioning and access parameters to enable designation of who is able to change which service access parameters, and under what circumstances. As an example, an Authorized Employee of Company A (AECA1) can provide a credentials and a batch of service access updates for a group of UEs ostensibly correlated to Company A. In this example, the indicated group of UEs can comprise at least one UE that is not properly correlated to Company A, for example, an included UE identifier comprises a typographical error, etc. In this example, log-in/security component 440 can properly allow AECA1 to present the batch of service access updates but can reject the update for the errant UE of the group based on AECA1 not being authorized to request service access updates for that particular UE identity. Further, log-in/security component 440 actions can include throwing an error, setting a flag, notifying one or more entities, etc., of the inclusion of a UE identity that is not associated with the credentials of AECA1. In an embodiment log-in/security component 440 can further facilitate secure interactions between more than one ANMC, e.g., communication between ANMC 510 and 511 of system 500, for example, can be subject to those ANMCs negotiating a permitted interaction via a log-in/security component, though this component is not illustrated for clarity and brevity in regard to system 500.

ANMC 410 can further comprise priority component 442 that can enable service access modification related to access identities and priority in a network. As an example, an enterprise, e.g., via entity component 430, can request a group of SIMs, e.g., comprising a SIM for UE 402, to have a different AI value in order for these SIMS to enable corresponding UEs to connect to a network service supporting connected vehicles in a corporate campus, e.g., a high priority service that can, for example, have low latency and high QoS to reduce the likelihood of a vehicular accident, which AI and priority modification can be addressed via priority component 442 of ANMC 410. Moreover, ANMC 410 can comprise slice component 444 that can enable service access modification related to network slice access in a network. As an example, UE 402 can roam in a user plane enterprise private network, where the private network is typically not considered the same as a carrier network, e.g., a hotel guest's UE can subscribe to AT&T as a carrier but can enter a hotel that operates a private 5G system. In this example, the enterprise can subscribe to ANMC management services and can be able to determine which network slices a "roaming hotel guest" can be given access to. Accordingly, in this example, slice component 444 can facilitate service access modification for the example guest's UE based on hotel system input as service access modification information 432, e.g., via entity component 430 to slice component 444 of ANMC 410 subject to gatekeeping by log-in/security component 440. The resulting service access modification can then be propagated to the example AT&T network, e.g., core network equipment 420, the hotel network, e.g., as another unillustrated network equipment, and to the guest UE, e.g., UE 402, such as via over-the-air service access update 434 via AT&T RAN 491, etc. In an embodiment, ANMC 410 can employ a translation component to mitigate service access mismatches between networks, e.g., between the example AT&T network and the example hotel private network.

Figure 5:
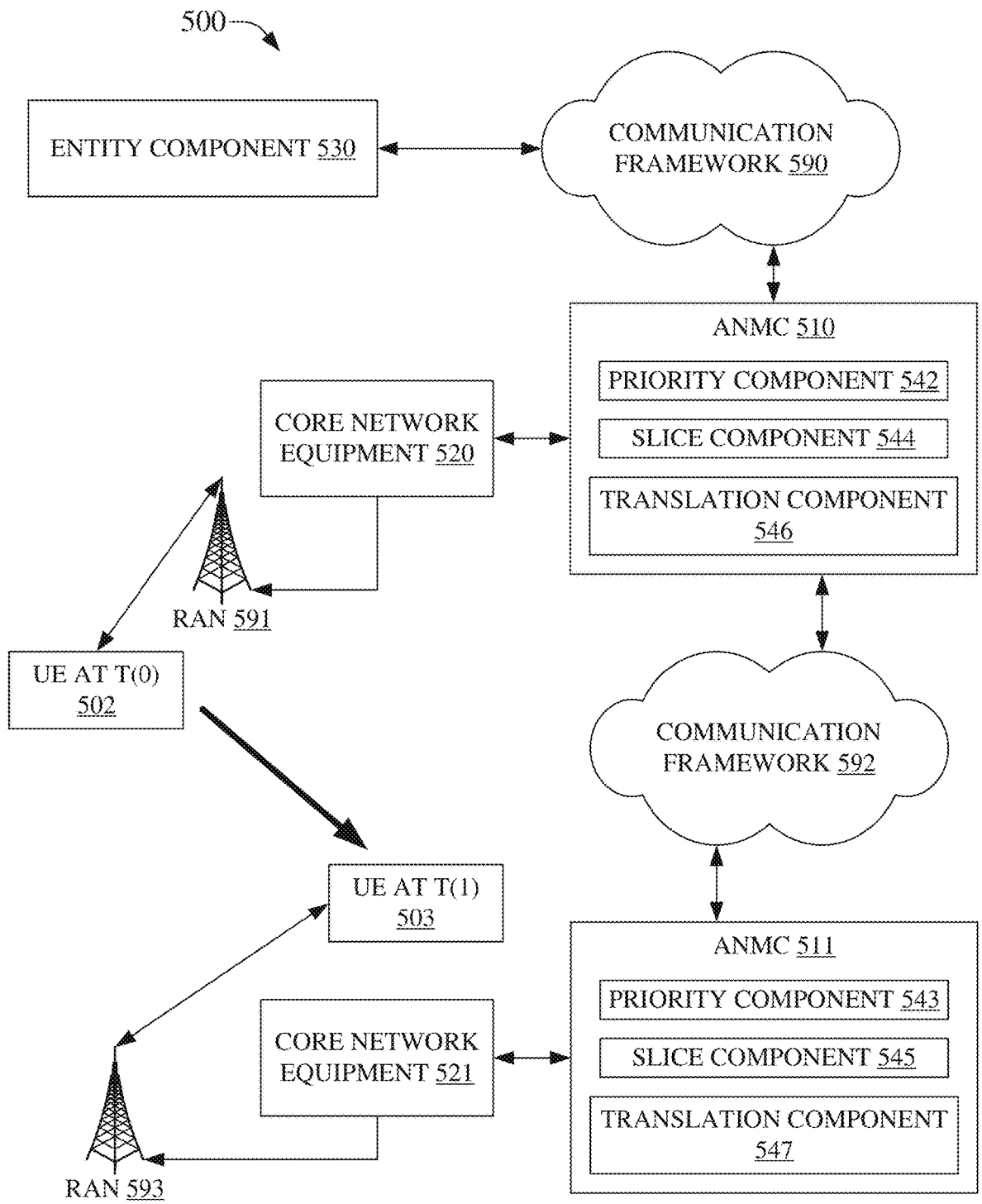
FIG. 5 is an illustration of an example system enabling migration of service access management parameters between different networks, wherein a translation layer can support network agnostic access identifier and network slice access management, in accordance with aspects of the subject disclosure.

FIG. 5 is an illustration of an example system 500 that can facilitate migration of service access management parameters between different networks, wherein a translation layer can support network agnostic access identifier and network slice access management, in accordance with aspects of the subject disclosure. System 500 can comprise core network equipment 520 that can be communicatively connected to ANMC 510. In an embodiment, ANMC 510 can operate remotely from core network equipment 520, as illustrated. In other embodiments, ANMC 510 can be comprised in core network equipment 520, not illustrated but see, for example, system 200, etc. As in other presently disclosed systems, core network equipment 520 can support operation of a network and, generally, core network equipment 520 can be communicatively coupled to UE at T(0) 502 via communication framework, here in system 500 illustrated as RAN 591.

System 500 can further comprise core network equipment 521 that can be communicatively connected to ANMC 511. In an embodiment, ANMC 511 can operate remotely from core network equipment 521, as illustrated. In other embodiments, ANMC 511 can be comprised in core network equipment 520. Again, core network equipment 520 can support operation of a network and, generally, core network equipment 521 can be communicatively coupled to UE at T(1) 503 via RAN 593. System 500 can illustrate that a first network affiliated with core network equipment 520 can be distinct from a second network affiliated with core network equipment 521, e.g., UE at T(0) 502 can transition from being served by an example first network comprising RAN 591 to UE at T(1) 503 being served by an example second network comprising RAN 593, as indicated by the heavy arrow from UE at T(0) 502 to UE at T(1) 503. The example first and second networks can communicate via communication framework 592, for example, ANMC 510 can communicate to ANMC 511 via communication framework 592, core network equipment 520 can communicate to core network equipment 521 via communication framework 592 (not illustrated), etc. As has been noted elsewhere herein, transitioning a UE from a first network to a second network can be benefited by coordinating service access.

As is illustrated, ANMC 510 and ANMC 511 can coordinate service access among different networks, for example, between two carrier networks, between a private network and a carrier network, between two private networks, etc. In an embodiment, ANMC 510 can employ priority component 542 to determine changes to AI and priority parameters between UE at T(0) 502 and core network equipment 520 based on input form entity component 530. Similarly, slice component 544 can perform similar functions in regard to network slice access parameters. ANMC 510 can then coordinate with ANMC 511 such that service access can be propagated to core network equipment 521 and where UE at T(0) 502 migrates to RAN 593, e.g., as UE at T(1) 503, service access can continue the same as, or similar to, when UE at T(0) 502 was supported by RAN 591.

ANMC 510 and ANMC 511 can correspondingly comprise translation components 546 and 547. A translation component can facilitate coordinating service access between networks. In an example, core network equipment 520 can employ first AI values, priority values, and/or network slices. In this example, core network equipment 521 can employ second AI values, priority values and/or network slices that can be the same as, similar to, or quite different from those employed by core network equipment 520. Translation component 546 can interact with ANMC 511, for example, via translation component 547, to enable transitions of UEs between related networks. In this example, if the first and second AI values are the same, and the first and second priority values are similar, but the first and second network slices are very different, then translation components 546 and/or 547 can support retention of AI values, retention of priority value where they are deemed sufficiently similar, and modification of network slice access parameters for UE at T(0) 502 transitioning to UE at T(1) 503, e.g., the AI values are the same in both networks, and the priority values can be determined to be sufficiently similar, however the network slices being quite different can require the network slice access parameters be updated to allow UE at T(1) 503 to have similar access as UE at T(0) 502. In this example, transition component 546, 547, etc., can determine alternate network slices that can provide sufficiently similar service access, can seek to initiate new slices to reach a sufficiently similar network slice access profile, can indicate that no sufficiently similar network slice access profile exists on the example second network and can initiate other corrective actions, etc. In short, transition component 546, 547, etc., can perform functions to support migration between networks, including modifying service access parameters, e.g., in an example second network, in a UE, etc., so that a transition between a first and second network can maintain adequate service access.

A translation component, e.g., 546, 547, etc., can comprise, for example, provisioning interface for carriers to define service level types (SSTs), e.g., what different SSTs mean and under what circumstances SSTs can be allowed, for example, a subscriber roaming in Europe may only be allowed a designated network slice between business hours. Embodiments of the disclosed subject matter can employ the provisioning interface to access an external provisioning database for enterprises to define SST values and subscriber security profiles. As such, a translation component can be quite beneficial in determining whether a roaming UE can be allowed to use a certain network slice of a roamed carrier without necessitating that all carriers employ a standardized group of SST definitions, e.g., the translation component enables an ANMC to analyze SSTs of different networks to determine what matches, what is a near match, what doesn't match, what needs to be created, and what hasn't been created in the context of migrating a UE between networks while maintaining service access.

It is further noted that ANMC 511 can similarly comprise priority component 543 that can enable service access modification related to access identities and priority in a network corresponding to ANMC 511. Moreover, ANMC 511 can comprise slice component 545 that can enable service access modification related to network slice access in the network corresponding to ANMC 511. Moreover, even though it is not expressly illustrated in system 500 for clarity and brevity, an ANMC, e.g., 510, 511, etc., can comprise a log-in/security component, e.g., the same as or similar to log-in/security component 440, etc., that can limit access to an ANMC for unauthorized users.

Figure 6:
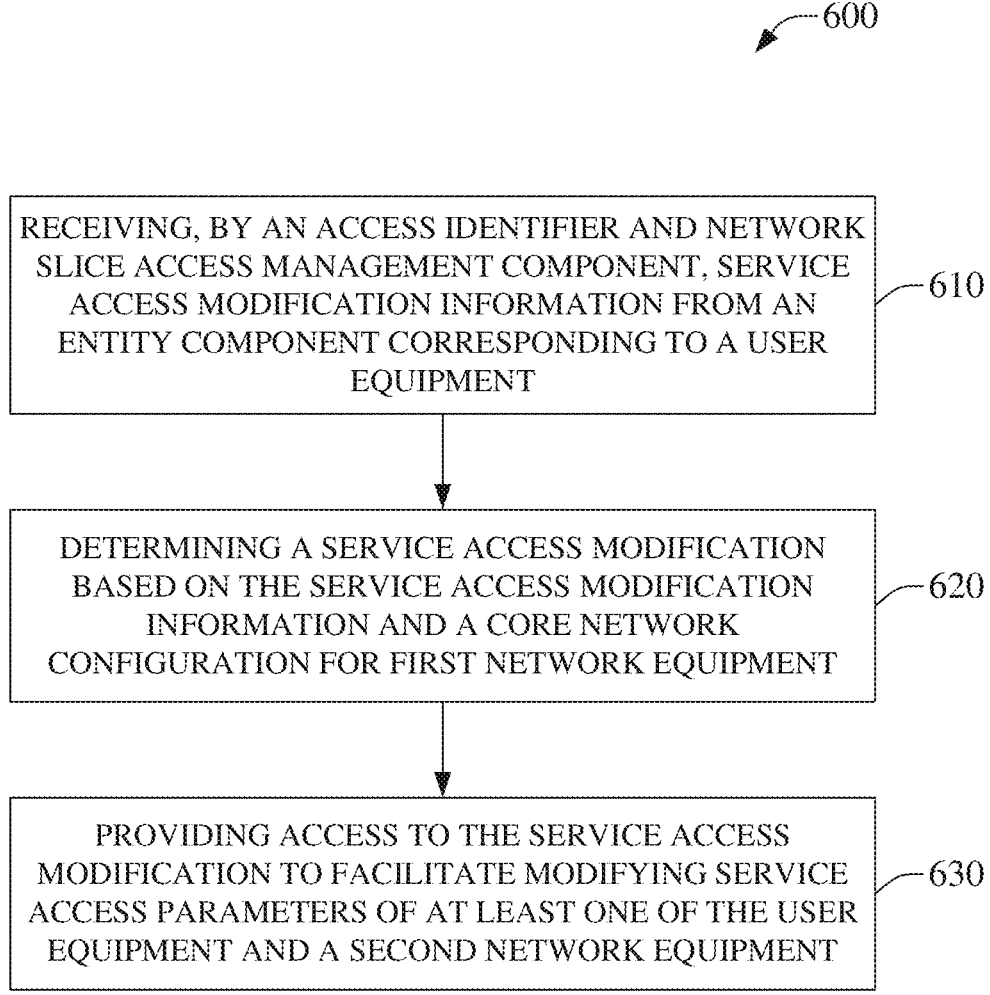
FIG. 6 is an illustration of an example method enabling modifying service access via an access identifier and network slice access management function, in accordance with aspects of the subject disclosure.
Figure 7:
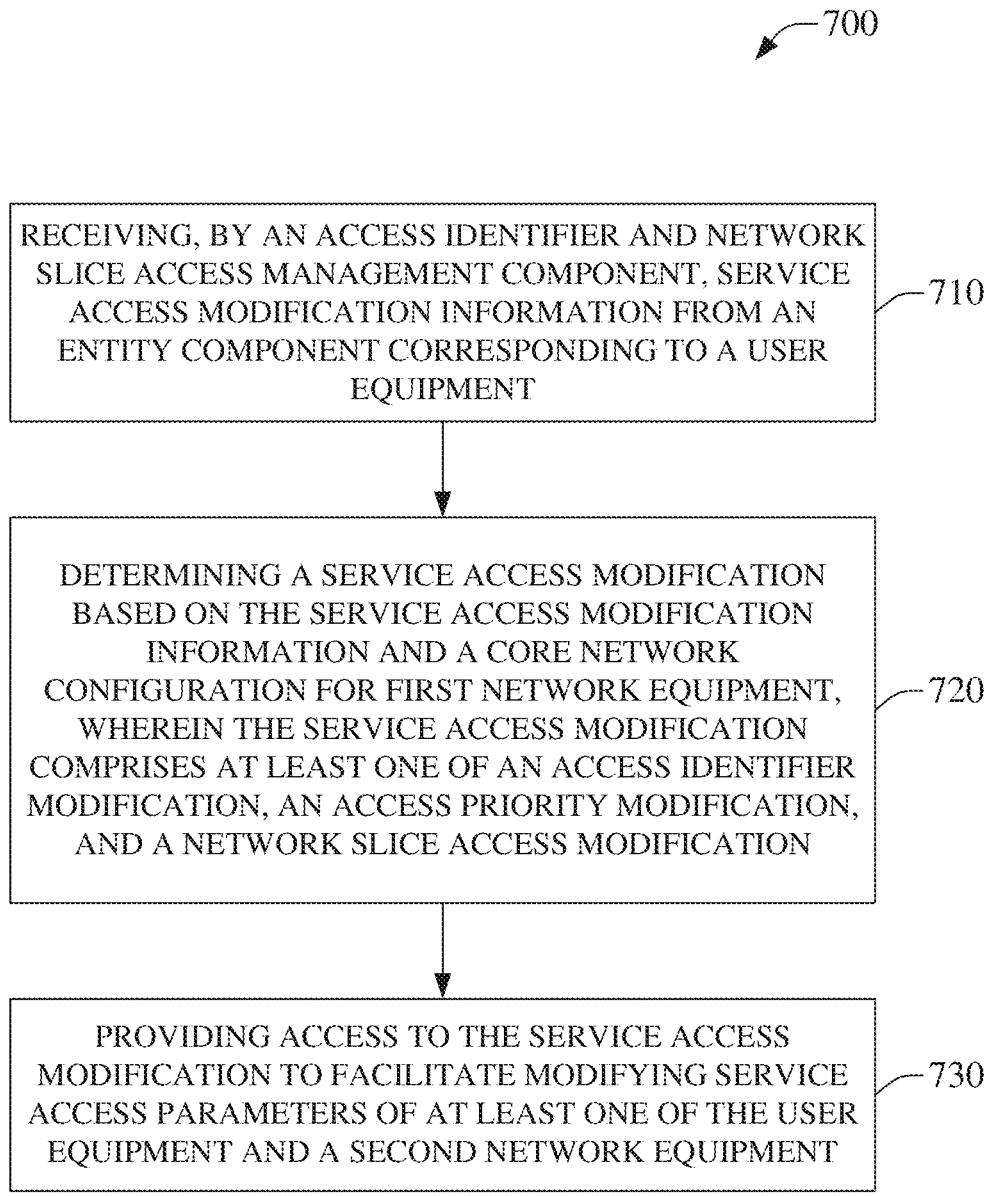
FIG. 7 illustrates an example method facilitating updating one or more of an access identity, an access priority, and a network slice access via an access identifier and network slice access management function, in accordance with aspects of the subject disclosure.
Figure 8:
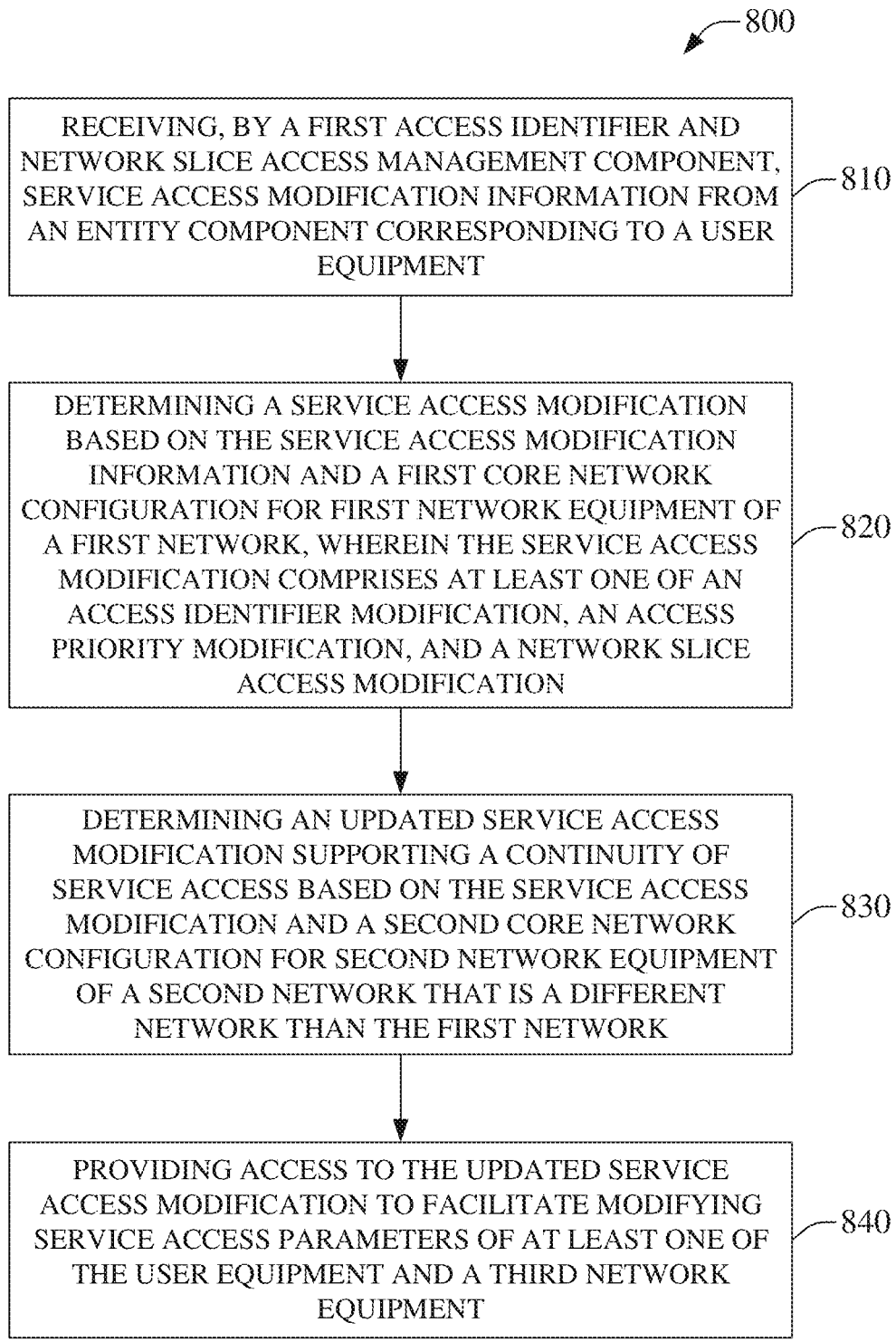
FIG. 8 illustrates an example method that enables translating a service access modification of a first network based on a configuration of a second network to support service access continuity, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate modifying service access via an access identifier and network slice access management function, in accordance with aspects of the subject disclosure. At 610, method 600 can comprise receiving service access modification information (SAMI). The SAMI can be received from a customer/enterprise (entity) component, e.g., entity component 220, 320, 420, 520, etc. The SAMI can be received by an access identifier and network slice access management component (ANMC), e.g., ANMC 110, 210, 310, 410, 510, 511, etc. SAMI can indicate a desired service access modification, e.g., an entity, such as a customer or enterprise, can seek to alter, modify, update, change, delete, revoke, add, provision, etc., access to a service, typically provided via a network, such that a SAMI can correspond to changes that, for example, an enterprise might want to effect on employee devices, such as enabling access to higher priority services, removing access to some network data store, limit video streaming services in sensitive areas of a corporate campus for security reasons or ITAR compliance, etc. As such, an entity can generate SAMI that can be received by an ANMC in an effort to cause a change, modification, etc., in access to a service. As an example, a corporate customer can seek to remove access for non-critical employee devices to some carrier network slice associated with an expensive service to reduce overall business expense, in which example SAMI can indicate UE identities and what service access should be, in this example, restricted.

At 620, method 600 can comprise determining a service access modification based on the service access modification information and a core network configuration for first network equipment. Generally, a UE can be associated with a carrier that can provide access to services via a carrier network. As such, the UE can typically have some default service access parameters, which can have been modified at some point, and which can be the target of modification based on the SAMI at 610. An ANMC can therefore determine a service access modification in light of the corresponding carrier network and in view of the SAMI. The resulting service access modification can therefore be meaningful in a network of the UE, e.g., via first network equipment.

Access to the service access modification can then be provided at 630 of method 600. This can facilitate modifying service access parameters. At this point method 600 can end. The parameters can be modified at the UE, a second network equipment, or both the UE and the second network equipment.

Generally, the second network equipment can be the same network equipment as the first network equipment at 620. However, in some embodiments, for example, where a UE will transition to another network, the second network equipment can be different network equipment than the first network equipment. In these types of embodiments, e.g., where the first and second network equipment are not the same network equipment, the service access modification should, at 620, still be based on the first network equipment, albeit, that it should also comport with the second network equipment configuration, e.g., the modification of service access can maintain continuity between the two example networks, errors can be indicated, or other corrections and mitigations can be undertaken. In an example, a UE can transition from a carrier network to a private corporate network that can have been designed to inherit the carrier network service access parameters, e.g., the private and carrier network can each use the same nomenclature for access identifiers, priority indicators, and network slices, although the private corporate network might not provide all the same services as the carrier. However, in this example, a determined service access modification can be applied to each of the UE, the carrier network, and the private corporate network, where the service is available, because the nomenclature is the same. As such, in this example, access to the service access modification by the private corporate network equipment does not need modification despite the service access modification being determined for the carrier network equipment configuration in this particular example.

FIG. 7 illustrates example method 700 facilitating updating one or more of an access identity, an access priority, and a network slice access via an access identifier and network slice access management function, in accordance with aspects of the subject disclosure. Method 700, at 710, can comprise receiving service access modification information (SAMI). The SAMI can be received from a customer/enterprise (entity) component, e.g., entity component 220, 320, 420, 520, etc. The SAMI can be received by an access identifier and network slice access management component (ANMC), e.g., ANMC 110, 210, 310, 410, 510, 511, etc. SAMI can indicate a desired service access modification, e.g., an entity, such as a customer or enterprise, can seek to alter, modify, update, change, delete, revoke, add, provision, etc., access to a service, typically provided via a network, such that a SAMI can correspond to changes. As such, an entity can generate SAMI that can be received by an ANMC in an effort to cause a change, modification, etc., in access to a service.

At 720, method 700 can comprise determining a service access modification based on the service access modification information and a core network configuration for first network equipment. In method 700, the service access modification can impact an access identifier, an access priority, a network slice access, or other service access. As such, the service access modification based on the first network equipment core network configuration and the SAMI can facilitate alteration, updating, changing, etc., previously assigned access identifiers corresponding to what services of a network are accessible to a UE. Similarly, the service access modification can facilitate alteration, updating, changing, etc., previously assigned access priority indicators for the UE. Moreover, the service access modification can facilitate alteration, updating, changing, etc., network slice access previously allowed for the UE. In embodiments of the disclosed subject matter, combinations of these service access modifications can also be implemented.

At 730, method 700 can comprise providing access to the service access modification to facilitate modifying service access parameters. At this point method 700 can end. The parameters, as has been disclosed elsewhere herein, can be modified at the UE, at a second network equipment, or at both the UE and the second network equipment. Also, as is noted elsewhere herein, in some embodiments the first and second network equipment can be the same network equipment, while in other embodiments, the first and second network equipment can be different network equipment.

FIG. 8 illustrates example method 800, enabling translating a service access modification of a first network based on a configuration of a second network to support service access continuity, in accordance with aspects of the subject disclosure. Method 800, at 810, can comprise receiving service access modification information (SAMI) at a first access identifier and network slice access management component (ANMC). As before, the SAMI can be received from a customer/enterprise (entity) component, e.g., entity component 220, 320, 420, 520, etc. The SAMI can indicate a desired service access modification, e.g., an entity, such as a customer or enterprise, can seek to alter, modify, update, change, delete, revoke, add, provision, etc., access to a service, typically provided via a network, such that a SAMI can correspond to changes. As such, an entity can generate SAMI that can be received by the first ANMC in an effort to cause a change, modification, etc., in access to a service.

At 820, method 800 can comprise determining a service access modification based on the SAMI and a first core network configuration for first network equipment. As previously disclosed, the service access modification can impact an access identifier, an access priority, a network slice access, or other service access. As such, the service access modification based on the first network equipment core network configuration and the SAMI can facilitate alteration, updating, changing, etc., previously assigned access identifiers corresponding to what services of a network are accessible to a UE. Similarly, the service access modification can facilitate alteration, updating, changing, etc., previously assigned access priority indicators for the UE. Moreover, the service access modification can facilitate alteration, updating, changing, etc., network slice access previously allowed for the UE. In embodiments of the disclosed subject matter, combinations of these service access modifications can also be implemented.

Method 800, at 830, can comprise determining an updated service access modification. The updated service access modification can support a continuity of service access and can be based on the service access modification and a second core network configuration for second network equipment of a second network that is a different network than the first network. In an embodiment, movement of a UE from the first core network to the second core network, e.g., which can occur when a UE moves from a first network to a second network, can entail translation of services that are accessible via each core network to support continuity of service access when a UE transitions between the two networks. As an example, if a first service of a first core network guarantees latency under 100 milliseconds, and a second service of a second core network guarantees latency under 80 milliseconds, then a UE using the first service can experience service access continuity when transitioning to the second service because the second service has better latency than the first service. However, if in this example, the second core offers a third service that guarantees latency under 120 milliseconds, this third service should not typically be accessed according to the updated service access modification because there is not service continuity where the third service has worse latency than the first service. In this situation, an ANMC can seek a higher level of service, e.g., the second service, indicate that service access continuity cannot be assured, or trigger other measures to resolve the possible loss of service access continuity.

At 840, method 800 can comprise providing access to the service access modification to facilitate modifying service access parameters. At this point method 800 can end. The parameters, as has been disclosed elsewhere herein, can be modified at the UE, at a third network equipment, or at both the UE and the third network equipment. In some embodiments the any two of the first, second, and third network equipment can be the same network equipment, while in other embodiments, none of the first, second and third equipment can be the same network equipment.

Figure 9:
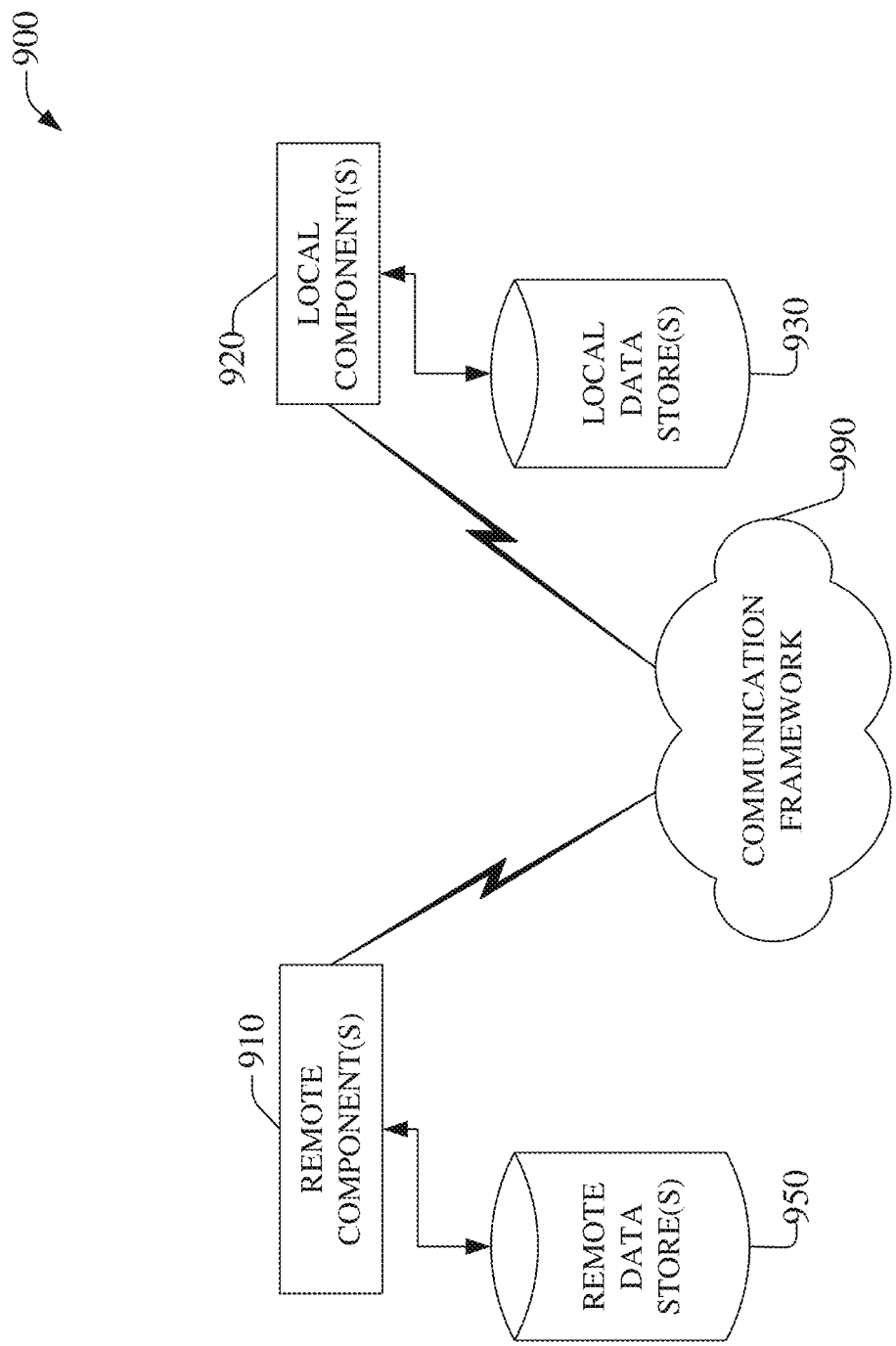
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise UE 102, 202, 302, 402, 502, 503, etc., entity component 230, 330, 430, 530, etc., core network component 320, 420, 520, 521, etc., RAN 491, 591, 593, etc., ANMC 511, etc., or other components located remotely from ANMC 110, 210, 310, 410, 510, etc.

The system 900 also comprises one or more local component(s) 920. The local component(s) 920 can be hardware and/or software (e.g., threads, processes, computing devices). In some embodiments, local component(s) 920 can comprise core network component 220, 520, etc., or other components located local to ANMC 110, 210, 310, 410, 510, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. As an example, ANMC 110, 210, 310, 410, 510, 511, etc., can locally generate a service access modification that can be communicated to UE 102, 202, 302, 402, 502, 503, etc., core network component 320, 420, 520, 521, etc., ANMC 511, etc., or other remotely located components, via communication framework 190, 290, 291, 390, 391, 490, 590, etc., RAN 491, 591, 593, etc., or other communication framework equipment. Remote component(s) 910 can be operably connected to one or more remote data store(s) 950, such as a hard drive, solid state drive, SIM card, device memory, etc., that can be employed to store information on the remote component(s) 910 side of communication framework 940.

Figure 10:
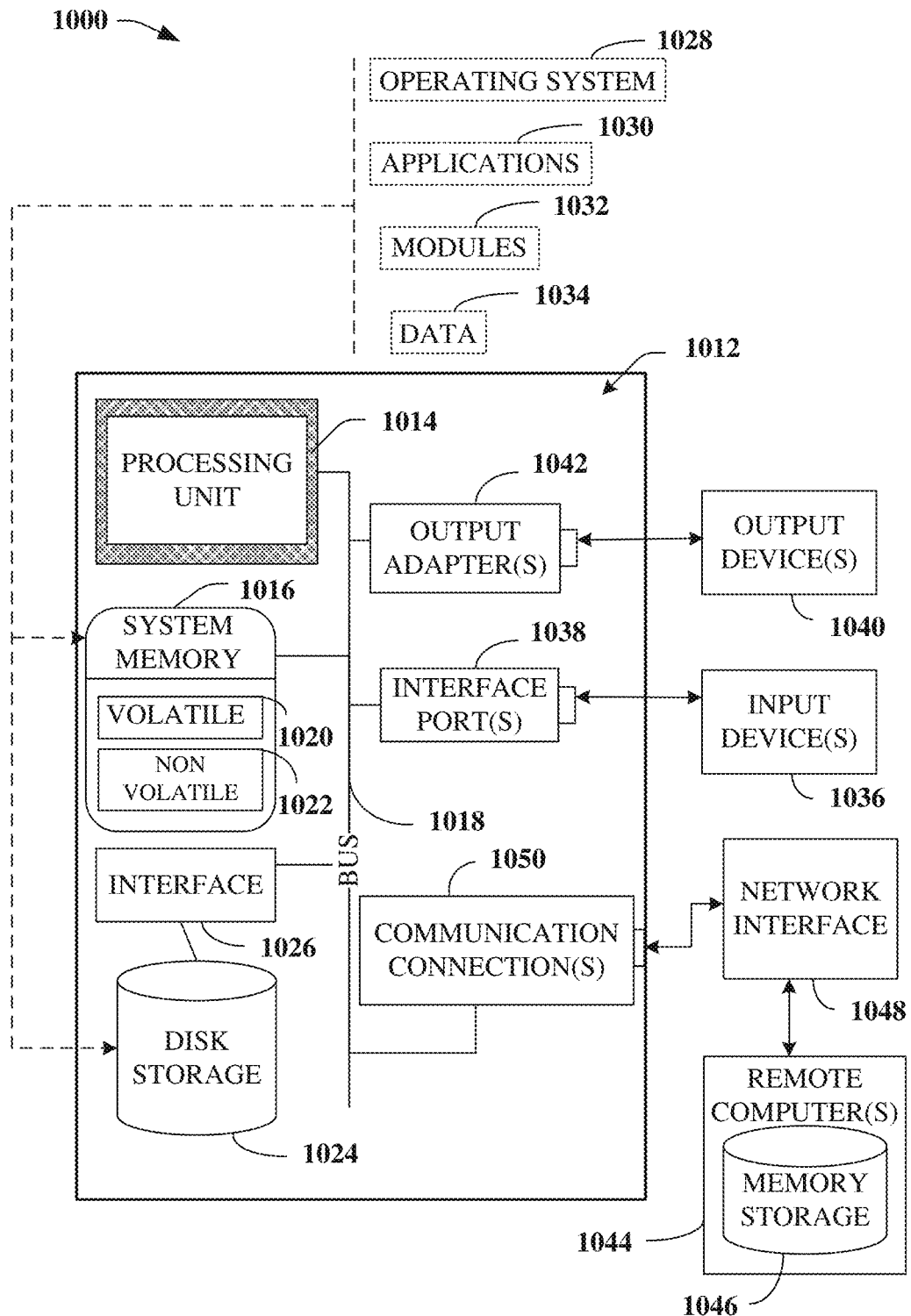
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), single board computers, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in entity component 230, 330, 430, 530, etc., core network component 220, 320, 420, 520, 521, etc., ANMC 110, 210, 310, 410, 510, 511, etc., or nearly any other device, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a service access modification profile for a user equipment based on service access modification information and a first configuration of a first network comprising network equipment, wherein the service access modification information is received from a second equipment that is located remotely from the first equipment and located remotely from network equipment of the first network, and wherein the service access modification information indicates accessible network services for the user equipment. The operations can further comprise communicating the service access modification profile to the user equipment and the network equipment to facilitate modifying an accessibility of network services by the user equipment via the network equipment.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone or other human voice sensor, accelerometer, biometric sensor, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted elsewhere herein, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," "5G network radio," and the like, are utilized interchangeably in the subject application, and refer to a wireless network component or appliance that serves and receives data, control, voice, video, sound, gaming, or substantially any datastream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to as extremely high frequency (EHF) waves. The wavelength (λ) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations comprising:
      receiving an indication to modify service access for a user equipment enabled for use of network services of a first network comprising first network equipment, wherein the indication was communicated from equipment located remotely from the first network equipment;
      determining a service access modification profile based on the indication and a configuration of the first network equipment; and
      enabling access to the service access modification profile to facilitate updating a service access parameter of the user equipment.

2. The device of claim 1, wherein the device is located remotely from the first network equipment.

3. The device of claim 2, wherein the device is implemented as a virtual network function in execution via server equipment located remotely form the first network equipment.

4. The device of claim 2, wherein the device is implemented at second network equipment comprised in a second network that is a different network than the first network.

5. The device of claim 1, wherein the device is implemented as a virtual network function in execution on the first network equipment.

6. The device of claim 1, wherein the indication to modify the service access for the user equipment is received from second network equipment comprised in a second network that is a different network than the first network.

7. The device of claim 1, wherein the service access parameter is a first service access parameter, wherein the service access modification profile further facilitates updating a second service access parameter, and wherein the second service access parameter is employed by a core network function enabled via the first network.

8. The device of claim 1, wherein the indication to modify the service access for the user equipment indicates modifying an access identity associated with the user equipment.

9. The device of claim 1, wherein the indication to modify the service access for the user equipment indicates modifying an access priority associated with the user equipment.

10. The device of claim 1, wherein the indication to modify the service access for the user equipment indicates modifying network slice access for the user equipment for network slices of the first network.

11. The device of claim 1, wherein the operations further comprise:
    determining an updated service access modification profile based on the service access profile and a configuration of second network equipment of a second network that is a different network than the first network; and
    enabling access to the updated service access modification profile to facilitate updating the service access parameter of the user equipment.

12. The device of claim 11, wherein the updated service access modification profile facilitates service access continuity between the first network and the second network.

13. The device of claim 12, wherein a lack of service access continuity triggers a mitigating response by the device, and wherein the mitigating response comprises sending alert data comprising an alert to an entity device associated with an entity associated with generating the indication to modify the service access for the user equipment.

14. A method, comprising:
    receiving, by a system comprising a processor, an indication to modify service access for a mobile device enabled for use of network services of a network comprising a network device, wherein the indication was communicated from a device located remotely from the network device;
    determining, by the system, a service access modification profile based on the indication and a configuration of the network device; and
    enabling, by the system, access to the service access modification profile as part of updating a service access parameter of the mobile device.

15. The method of claim 14, wherein the system is implemented as a virtual network function in execution via server equipment located remotely form the network device.

16. The method of claim 14, wherein the system is implemented as a virtual network function in execution on the network device.

17. The method of claim 14, wherein the service access parameter is a first service access parameter, wherein the enabling of the access to the service access modification profile is further part of updating a second service access parameter, and wherein the second service access parameter is employed by a core network function enabled via the network.

18. A non-transitory machine-readable medium, comprising executable instructions that, when executed by a processor, facilitates performance of operations, comprising:
- receiving, from equipment located remotely from the network equipment, an indication to modify service access for a subscriber equipment enabled for use of network services of a network comprising network equipment;
- determining a service access modification profile based on the indication and a configuration of the network equipment; and
- permitting access to the service access modification profile to enable updating a service access parameter of the subscriber equipment.

19. The non-transitory machine-readable medium of claim 18, wherein the indication to modify the service access for the subscriber equipment indicates modifying an access identity associated with the subscriber equipment or modifying an access priority associated with the subscriber equipment.

20. The non-transitory machine-readable medium of claim 18, wherein the indication to modify the service access for the subscriber equipment indicates modifying network slice access for the subscriber equipment for network slices of the network.

\* \* \* \* \*